United States Patent [19]

Fox

[11] Patent Number: 4,473,258
[45] Date of Patent: * Sep. 25, 1984

[54] DUAL WHEEL ADAPTER KIT

[76] Inventor: Floy Fox, Rte. 2, Box 60, Haskell, Okla. 74436

[*] Notice: The portion of the term of this patent subsequent to Apr. 14, 1998 has been disclaimed.

[21] Appl. No.: 252,852

[22] Filed: Apr. 10, 1981

Related U.S. Application Data

[63] Continuation-in-part of Ser. No. 69,722, Aug. 27, 1979, Pat. No. 4,261,621.

[51] Int. Cl.³ .............................................. B60B 11/00
[52] U.S. Cl. ................................ 301/36 R; 301/9 DN
[58] Field of Search ............. 301/36 R, 36 A, 36 WP, 301/13 SM, 38 R, 40 S, 9 DN

[56] References Cited

U.S. PATENT DOCUMENTS

| | | | |
|---|---|---|---|
| 1,297,243 | 3/1919 | Putnam | 301/36 R |
| 1,738,682 | 12/1929 | Baker | 301/36 R |
| 2,635,012 | 4/1953 | Rappaport | 301/36 R |
| 3,664,709 | 5/1972 | Barré | 301/38R |
| 4,261,621 | 4/1981 | Fox | 301/36 R |

Primary Examiner—H. Grant Skaggs
Attorney, Agent, or Firm—Head, Johnson, Stevenson

[57] ABSTRACT

An adapter kit for changing a single wheel mounting on a vehicle to a dual wheel mounting and comprising a sleeve adapted to be positioned against the outer surface of the single wheel in substantial axial alignment with the wheel axle and extending outwardly from the wheel, a plurality of longitudinally extending tube members ridigly secured to the wall of the sleeve, with a tube member being disposed in alignment with each of the apertures of the single wheel for receiving a threaded stem therethrough, nut members interposed between each tube and the usual lug bolts of the single wheel for securing a threaded stem to each lug bolt, each of the tube members extending beyond the outer end of the sleeve for a snug engagement with the usual annular recess provided on the inside surface of a second wheel for alignment of the second wheel against the outer end of the sleeve, and lug nuts removably secured to the outer ends of the threaded stems outboard of the second wheel for securing the wheel to the sleeve for conversion of the single wheel installation to a dual wheel installation.

4 Claims, 3 Drawing Figures

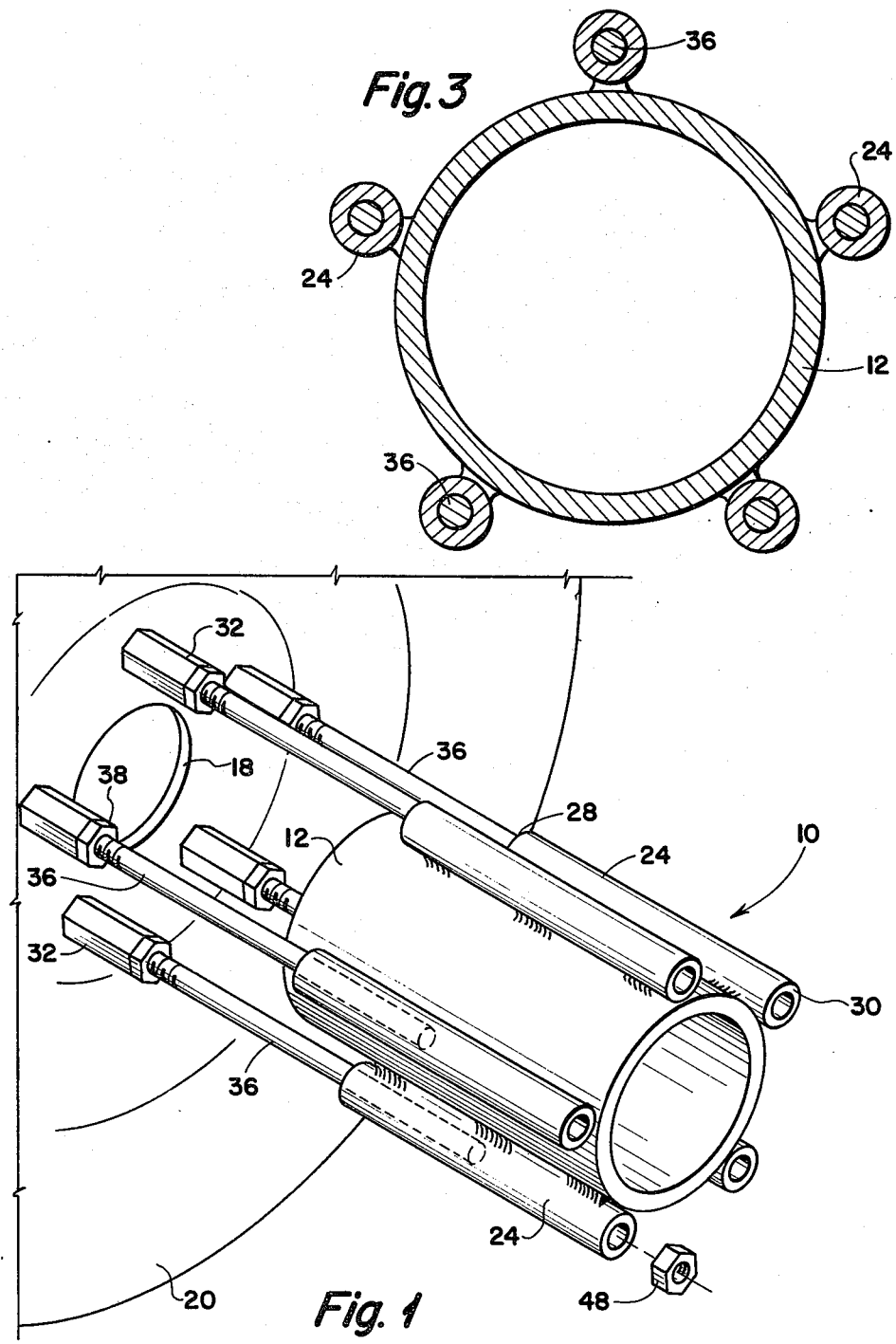

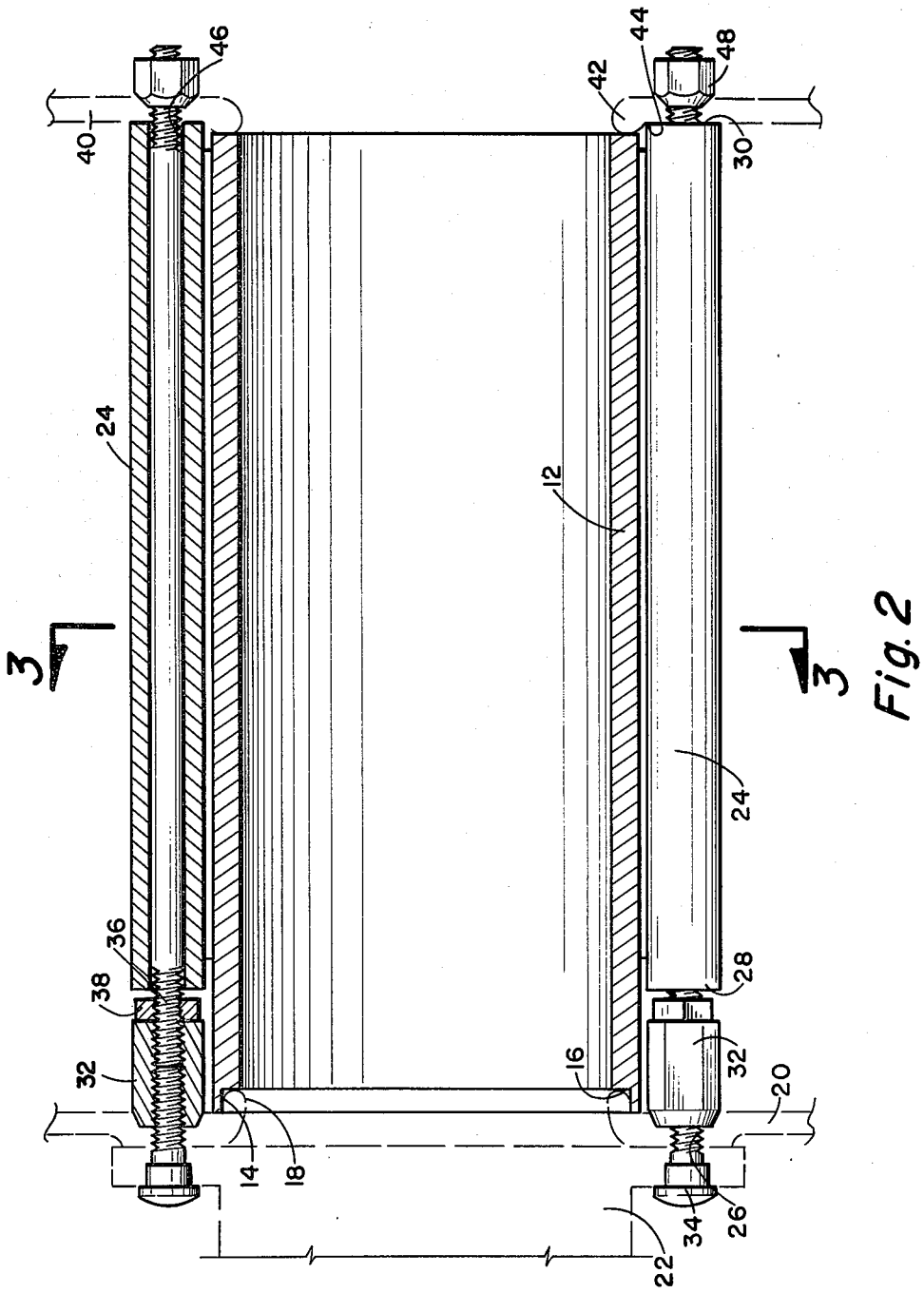

DUAL WHEEL ADAPTER KIT

CROSS-REFERENCE TO RELATED APPLICATION

This application is a continuation-in-part of my copending application Ser. No. 69,722, filed Aug. 27, 1979, entitled "Dual Wheel Adapter Kit", now U.S. Pat. No. 4,261,621, issued Apr. 14, 1981.

BACKGROUND OF THE INVENTION

1. Field of the Invention

This invention relates to improvements in wheeled vehicles and more particularly, but not by way of limitation, to an adapter kit for transforming the usual single wheel mounting of a vehicle into a dual wheel mounting.

2. Description of the Prior Art

Pick up trucks, and the like, are in widespread use today not only as commercial vehicles, but also as passenger or individually operated vehicles. The pick ups of a relatively heavy construction usually have somewhat strenuous work demands during operation thereof and are frequently built with a dual wheel arrangement at least at the rear wheel positions. Many of the pick ups are of a relatively light construction, however, and are normally provided with a single wheel at each corner of the vehicle. Of course, the light weight, single wheel models are usually considerably less expensive to buy, and as a consequence, the individually operated vehicles of this type are often of the single wheel variety. Owners of these vehicles have found that a dual wheel arrangement at the rear wheel positions has many advantages and greatly increases the overall utility of a vehicle. However, heretofore it has been quite expensive and difficult to alter the construction of the vehicle to achieve the dual wheel rear position therefor.

In order to solve this problem, a device to convert single rear wheels to dual wheels has been developed as shown in the J. C. Whitney & Company catalogs. This converter device, however, has many disadvantages in that the second wheel must be installed inside out, and the threaded stems securing the second wheel to the vehicle tend to loosen with use, and the instructions provided with the device states that the wheel studs and nuts must be retightened after each one hundred miles of driving. In addition, if the original lug nuts are to be used in connection with the device, they must be put on backwards. The disadvantages of this converter device will be readily apparent.

SUMMARY OF THE INVENTION

The present invention contemplates a novel adapter for converting a single wheel installation to a dual wheel arrangement wherein the second wheel is mounted on the vehicle in substantially the exact manner as the mounting of the original equipment wheel, and the entire conversion operation may be accomplished in a very short period of time. The usual lug nuts of the single wheel are initially removed from the vehicle, leaving the usual lug bolts extending axially outwardly from the wheel mounting. An elongated nut having the inner periphery thereof threaded is secured to each of the exposed lug bolts in lieu of the original lug nuts, and an elongated threaded stem is secured to the outer end of the newly mounted nuts in substantially axial alignment with the respective lug bolts. The original lug bolts may then be threadedly secured onto the threaded stems and moved to a position of engagement with the outer ends of the elongated nuts, and securely tightened thereagainst thereby securing the original wheel in its original position in the same safe and secure manner as originally designed for the vehicle.

A sleeve having an outer diameter preferably substantially equal to the outer diameter of the vehicle axle and an inner diameter corresponding to the outer diameter of the central core of the outer face of the single wheel mounting is provided with a plurality of circumferentially spaced longitudinally extending tubes secured to the walls thereof, with an individual tube being provided for receiving each threaded stem therethrough. The sleeve is provided with one open end adapted to be disposed against the outer surface of the single wheel and in axial alignment with the vehicle axle, with each of the tubes receiving a threaded stud therethrough as the sleeve is positioned against the wheel. The opposite end of the sleeve receives the inner face of the second wheel thereagainst, with the bolt circle determined by the threaded studs being in alignment with the normal annular recess provided at the bolt circle of the inner face of the second wheel. The outer ends of the tube members extend slightly beyond the outer limit of the sleeve for snug disposition within the annular recess of the wheel to provide an efficient engagement with the second wheel. The second wheel may thus be positioned against the outer ends of the tube members, with the tube members being in substantial axial alignment with the bolt holes of the second wheel whereby the outer ends of the threaded stems extend through the bolt holes. The lug nuts of the usual or well known type may be threadedly secured to the outer ends of the threaded stems for securing the second wheel to the vehicle. The novel adapter kit is simple and efficient in operation and economical and durable in construction.

BRIEF DESCRIPTION OF THE DRAWINGS

FIG. 1 is an exploded perspective view of a dual wheel adapter embodying the invention, and illustrating an installation procedure for converting a single wheel to a dual wheel.

FIG. 2 is a sectional elevational view of a dual wheel adapter embodying the invention, with portions shown in broken lines for purposes of illustration.

FIG. 3 is a view taken on line 3—3 of FIG. 2.

DESCRIPTION OF THE PREFERRED EMBODIMENT

Referring to the drawings in detial, reference numeral 10 generally indicates a dual wheel adapter comprising a sleeve 12 having one open end provided with an annular recess 14 providing an annular shoulder 16 on the inner periphery of the sleeve 12. The diameter of the recess 14 preferably substantially corresponds to the outer diameter of the usual central core or hub member 18 of a wheel 20, and the outer diameter of the sleeve 12 is preferably substantially equal to the outer diameter of the usual wheel axle 22, but not limited thereto. The recess 14 receives the hub member 14 therein during installation of the device 10 in combination with the wheel 16, and the outer end of the hub 14 bears against the shoulder 16, as will be hereinafter set forth. The opposite end of the sleeve 12 is also open, as particularly shown in FIGS. 1 and 2, for reducing the overall weight of the device 10 and reducing the construction costs thereof.

A plurality of elongated tubes 24 are welded or otherwise rigidly secured to the outer periphery of the sleeve 12, with an individual tube 24 being provided for each bore 26 normally provided in the wheel 16. Each tube 24 extends longitudinally along the outer periphery of the sleeve 12 in substantially parallel alignment with the longitudinal axis thereof. One end 28 of each tube 24 terminates in spaced relation with respect to the shoulder 16, and the opposite end 30 of each tube 24 extends slightly beyond the outer end of the sleeve 12 for a purpose as will be hereinafter set forth.

An elongated nut member 32 having the inner periphery thereof threaded is provided for threaded connection with each of the usual lug bolts 34 utilized with the wheel 20, and is of a length sufficiently great as to extend beyond the outer limit of each lug bolt when fully engaged therewith. An elongated threaded rod 36 is provided for threaded engagement with the open outer end of each nut 32, and is sufficiently long as to extend through the respective tube 24 and beyond the outer end thereof for a purpose as will be hereinafter set forth. It is preferable that the outer periphery of each stem 36 be threaded throughout its entire length, but the stems 36 are shown herein as being threaded only on the outer ends thereof for purposes of illustration, but not by way of limitation. The usual lug nut 38, or any other suitable nut, is threadedly secured to each rod 36 and disposed adjacent the outer end of the respective nut 32 and tightened securely against the nuts 32 prior to insertion of the rods through the tubes 24.

A second wheel 40, preferably of the same type as the wheel 20, may be disposed adjacent the outer end of the sleeve 12, with the end of the sleeve being disposed in abutment with the outer end of the hub portion 42 of the second wheel 40. The outer ends of the tubes 24 rest snugly within the annular recess 44 normally provided around the outer periphery of the hub 42 when the tubes 24 are disposed in substantial axial alignment with the normal bores 46 provided in the wheel 40, thus providing a secure positioning of the second wheel 40 against the device 10. The outer ends of the rods 36 extend through the respective bores 46 and suitable lug nuts 48 of any well known type may be threadedly secured to the projecting outer ends of the stems 36 and tightened thereagainst in the well known manner for safely securing the wheel 40 to the device 10. In this manner, the first wheel 20 becomes a companion to the second wheel 40 to provide a dual wheel assembly for the vehicle.

In order to install the device 10 and wheel 40 on the usual single wheel 20 of a suitable vehicle (not shown) and as illustrated in FIG. 1, the usual lug nuts 38 of the original installation of the wheel 20 are removed in the usual manner, leaving the outer ends of the lug bolts 34 projecting outwardly from the wheel 20. The elongated nuts 32 are threadedly engaged with the lug bolts 34 and rightened securely thereagainst in the usual or well known manner. A threaded rod 36 is secured to the outer open end of each nut 32, and the original lug nut 38, or any other suitable similar nut, is threadedly secured to the rod 36 and positioned against the nut 32, as particularly shown in FIG. 2. The lug nuts 38 are securely tightened against the nut 32 for securing the wheel 20 onto the axle 22 in the manner as originally installed, thus providing a safe installation for the wheel 20 when using the device 10 in combination therewith.

A special wrench (not shown) such as set forth in my aforementioned co-pending application may be provided for tightening of the lug bolts 38. When the lug nuts 38 have been properly tightened against the nuts 32, the sleeve 12 is disposed against the outer surface of the wheel 20 by telescoping the tubes 24 over the respective rods 36 until the open end of the recess 14 is disposed around the hub member 18 and the outer face of the hub 18 is disposed in abutment with the shoulder 16. In this manner, the rods 36 are extended through the tubes 24, and the wheel 40 may be positioned against the outer surface of the sleeve 12, with the outer ends of the tubes 24 being disposed in the annular recess 44 of the inner surface of the second wheel 40. The lug nuts 48 may be threadedly engaged with the extending ends of the rods 36 and securely tightened therewith in any well known manner, such as by the use of the usual lug wrench (not shown) or the like. It is important to note that the snug relationship between the tubes 24 and annular recess 44 provides a stability between the adapter 10 and the wheel 40, and the relationship between the recess 14 and the hub 18 provides for stability between the adapter 10 and the wheel 20 for a strong and safe structure. In this manner the wheel 20, which is a single wheel installation as originally provided on the vehicle, now cooperates with the wheel 40 to provide a dual wheel assembly for the vehicle. Of course, the process may be reversed for removal of the second wheel, if desired.

From the foregoing it will be apparent that the present invention provides a novel adapter kit for converting a single wheel installation on a vehicle to a dual wheel installation. The novel device comprises a sleeve adapted to be secured to the original wheel for effectively extending the length of the vehicle axle in an outboard direction, and having tube members cooperating with threaded rods for extending the length of the usual lug bolts whereby the second wheel may be secured to the outer end of the sleeve in the same general manner as the installation of the original wheel on the vehicle. The novel device provides a strons, efficient connection for the second wheel, and the entire conversion operation may be accomplished in a relatively short period of time.

Whereas the present invention has been described in particular relation to the drawings attached hereto, it should be understood that other and further modifications, apart from those shown or suggested herein may be made within the spirit and scope of this invention.

What is claimed is:

1. An adapter kit for converting a single wheel installation of a vehicle to a dual wheel installation, the vehicle wheels having a centrally disposed annular recess and the adapter kit comprising flangeless sleeve means removably securable to the installed single wheel and extending outwardly therefrom in substantial alignment with the vehicle axle, tube members secured to the wall of the sleeve means and in substantial axial alignment with the vehicle lug bolts, elongated nut members removably secured to the vehicle lug bolts, threaded rod members removably securable with said elongated nut members and extending through the tube members and beyond the outer end of the sleeve means, locking nut members threadedly secured to said rod members for securely locking the rod members in position, the outer end of said tube members being snugly engagable with the normal annular recess on a second vehicle wheel whereby the second wheel may be disposed in direct engagement with the outer end of the sleeve means and secured thereagainst, and lug nut members engagable with the outer end of the rod members for securing the second wheel against the sleeve means.

2. An adapter kit as set forth in claim 1 wherein the sleeve means is provided witn an annular recess at one open end thereof, said recess having a diameter corresponding to the outer diameter of the hub of the vehicle wheel for receiving the hub therein to facilitate alignment of the sleeve means with the vehicle wheel.

3. An adapter kit as set forth in claim 1 wherein the outer ends of the tube member extend beyond the outer end of the sleeve means to provide said snug engagement with the annular recess of the second wheel.

4. An adapter kit as set forth in claim 3 wherein the tube members are disposed in substantial axial alignment with the bolt circle of the second wheel whereby the rod members extends therethrough for receiving the lug nut members.

* * * * *